March 30, 1943.    J. McARTHUR    2,315,440
WEED GUARDED FISH LURE
Filed May 13, 1941
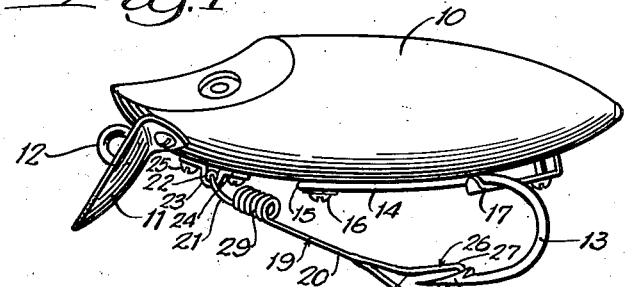
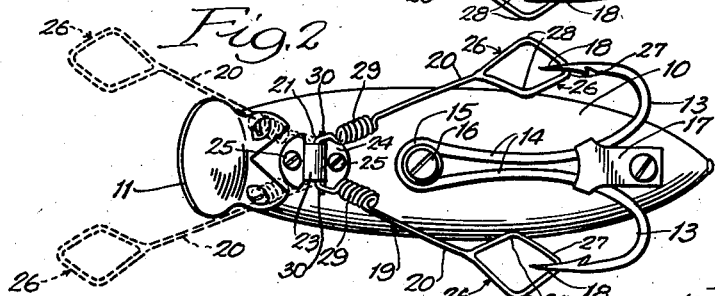
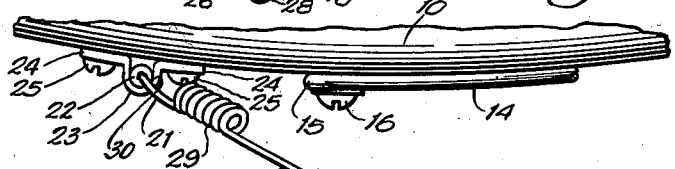
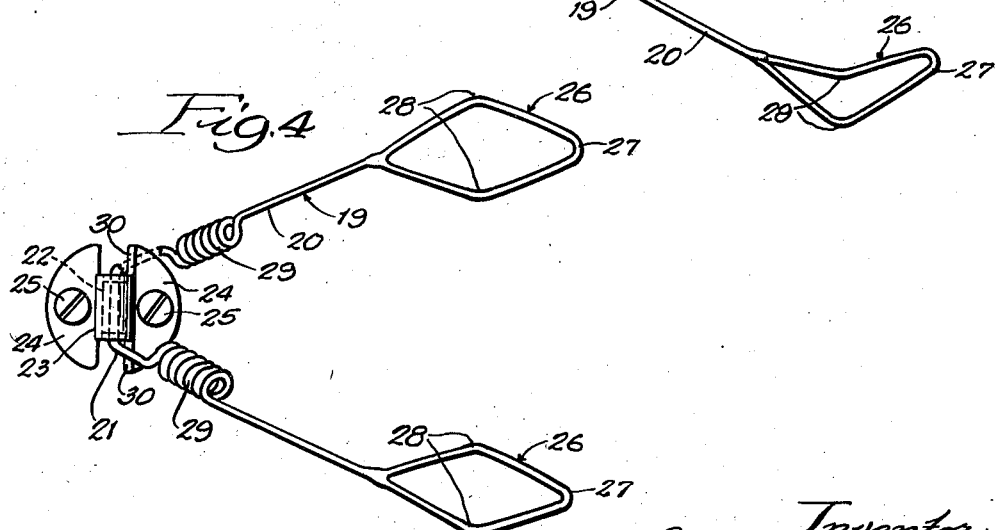
Inventor:
Joseph McArthur,
By Immung & Immung
Attorneys.

Patented Mar. 30, 1943

2,315,440

UNITED STATES PATENT OFFICE 2,315,440

WEED GUARDED FISH LURE

Joseph McArthur, Dowagiac, Mich., assignor to James Heddon's Sons, Dowagiac, Mich., a corporation of Michigan Application May 13, 1941, Serial No. 393,204

4 Claims. (Cl. 43—39)

The present invention is directed to a weed guard for the hooks of a fish lure which affords means for holding the looped tips of the guard prongs under a slight degree of spring tension in contact with the hook points, with provision, however, for the instant release of the guard prongs under the impact of a fish's strike which will permit the prongs to swing downwardly away from the hooks so as not to interfere therewith during the reeling in and landing of the fish or with the removal of the fish from the hook after landing.

The hinge mounting for the guard prongs is one which affords the necessary stops or abutments to enable the prongs to be sprung or "cocked" beneath the hook tips under light spring tension, so that they will be retained against displacement, while the looped ends of the prongs are of sufficient width to restore back against the hook tips in the event they are sprung inwardly by the impact of the lure against logs, rushes, lily pads, or other obstructions during casting, which might otherwise cause the release of the prongs and the swinging forward of the guard as a whole prior to the strike of a fish.

The arrangement is one which maintains the guard in its "cocked" position so long as either of the prong loops engages the associated hook, so that even if one of the prongs should become accidentally disengaged, the lure will continue to function properly.

The present guard is designed to cooperate with twin hooks pointing downward, which arrangement presents a more complicated problem than that involved in the guarding of a single upwardly pointing hook, so that it becomes necessary to make provision for holding the guard at all times in position to protect both of the downwardly pointing hooks under conditions which would otherwise occasion immediate fouling if the lure is cast into weeds or other obstructions.

The early release of the guard from the hook points during the strike not only insures the hooking of the fish but allows the guard to swing free, so that there will be less danger of bending or otherwise damaging the comparatively fragile weed guard when the angler is removing the struggling fish from the hooks.

Further objects and details will appear from the description of the invention in conjunction with the accompanying drawing, wherein—

Figure 1 is a side elevation of a lure for a plug bait body provided with the hook guard of the present invention;

Fig. 2 is a plan view of the under side of the lure;

Fig. 3 is an enlarged side elevation of the guard showing the method of hinging the same; and Fig. 4 is an end plan view of the same.

The guard, as shown, is applied to a plug bait body 10 of conventional ovate formation having a chin piece 11 secured to and downwardly and forwardly projecting from the under side of the head near the tip.

The body is provided with the usual line tie 12 and with twin hooks 13 which, as shown, are formed integrally with short shanks 14 extending in substantially parallel relation and terminating at the forward end in a loop 15 which receives a screw 16 located near the center of the under side of the bait body. The hook shanks are further supported by a clip 17 near the rear end of the body, and beyond the clips the hook bends are recurved and terminate in the barbed points 18.

The hook ends are so disposed that the hooks will project downwardly and laterally beyond the sides of the body, so that unless effectually guarded they would become immediately befouled if the lure were cast into weedy waters. At the same time the means provided for securing the twin hooks to the body insure a firm connection which holds the hooks rigidly in downwardly and laterally projecting position, so that the fish, striking at the lure, will encounter the resistance of the body in driving the hooks into the flesh of the jaws.

The guard 19 is in the form of a V-shaped integral structure comprising prongs 20 which converge forwardly and are united by a cross head 21 which is entered through a tubular sleeve 22 held in place by a U-shaped clip 23 terminating in ears 24 which receive screws 25 entered into the body. This affords a hinge for the guard as a whole, which allows it, when released, to be swung downwardly and forwardly into the dotted line position shown in Fig. 2.

The rear or free end of each guard prong terminates in an open loop 26, which, as shown, is of diamond-shaped configuration so disposed that when the tip 27 of the loop is sprung in behind the associated hook point it will engage the same and hold the prong cocked under spring tension. The loop is bent across its middle to afford an elbow 28 on each side of the loop, and the loop as a whole has a sufficient spread laterally so that if it is momentarily deflected inwardly toward the body by contact with an obstruction in casting or the like it will spring back into engaging position with the hook point and not become easily released therefrom save under the impact of a fish's strike.

It will be noted that the outer portion of the loop beyond the elbows 28 slopes upwardly to the tip at such an angle as to afford a converging of throated area of contact with relation to the hook point, so that if the loop becomes accidentally displaced it will be guided back into position to center the hook point within the abrupt bend at the tip end of the loop.

Although the guard as a whole is made of relatively thin spring wire, it is desirable to center the flexibility of each prong at or near the converging head end of the guard, and for this purpose each of the springs is provided with a coiled section 29 which affords the center of flexibility, so that the remainder of the guard may be made of sufficiently stiff wire to prevent accidental bending or displacement.

In order to limit the inward swing of the guard, the clip 23 at its base is cut to afford a stop shoulder 30 on each side, which limits the free movement of the guard, so that thereafter, in order to cock the loops upon the respective hook points, it is necessary to flex the prongs slightly, so that when engaged they will be held under sufficient spring tension to prevent accidental release, and so that, if they are accidentally sprung inwardly by contact with an obstruction, they will immediately restore to hook engaging position.

The general contour of the loops with relation to the hook points is such as to bring the bends or elbows 28 laterally beyond the hook points, so that weeds or obstructions will be effectively deflected; or in other words, the hook point will lie within the plane of the bend or angled loop, so that it will not be exposed to the weeds when the lure is being drawn through the water.

When the lure is in use in casting, for which it is primarily designed, both of the guard loops will be cocked in relation to the respective hook points and held under spring tension thereon, but in the event the lure strikes a rock, log or similar rigid obstruction which causes one or both of the guard prongs to be deflected inwardly toward the body, the prong or prongs will immediately spring outwardly with a minimum liability of escaping the hook point or points, by reason of the wide spread of the loops.

Furthermore, even though one of the loops should escape, the guard as a whole will still be held in guarding position by the engagement of the remaining loop, so that complete release of both of the loops is required before the guard will swing free. When, however, a fish strikes, the impact of the jaws against the body and against the prongs will ordinarily release both of the prongs, so that the guard may swing free during the landing of the fish, and thereafter, during the unhooking of the fish, the guard will be out of the way so that it is not liable to be bent or displaced by the manipulation of the lure in the unhooking of the fish.

The guard of the present invention is designed with particular reference to a bait body having twin hooks with widely spread hook points rigidly secured to the under side of the body. A bait having the hooks so arranged is peculiarly effective in the hooking of game fish, but the lateral spread of the hook points and their position beneath the body makes the bait peculiarly susceptible to fouling by weeds or other obstructions, so that, unless guarded, such a bait is practically useless in weedy water.

The guard prongs of the present invention afford a wide spread which effectively serve to displace weeds laterally and downwardly and guard the hook points, without, however, materially interfering with the striking and hooking of the fish.

I claim:

1. In a fish lure, the combination of a bait body, twin hooks rigidly secured to the under side of the body and recurved to present their points laterally below and beyond the sides of the body, a guard having rearwardly diverging prongs positioned to be cocked behind the respective hook points, and means for hinging the guard at its forward end to permit the same to swing freely when the prongs are disengaged from the hook points, said means including stops adapted to limit the upward movement of the guard prongs so that in cocking the prongs behind the hook points the same will be held under spring tension when cocked, the prongs being provided with coil spring sections to center the flexibility therein.

2. In a fish lure, the combination of a bait body, twin hooks rigidly secured to the under side of the body and recurved to present their points laterally below and beyond the sides of the body, a guard having rearwardly diverging prongs provided with open loops positioned to be cocked behind the respective hook points, and means for hinging the guard at its forward end to permit the same to swing freely when the prongs are disengaged from the hook points, said means including stops adapted to limit the upward movement of the guard prongs so that in cocking the prongs behind the hook points the same will be held under spring tension when cocked, the prongs being provided with coil spring sections to center the flexibility therein.

3. In a fish lure, the combination of a bait body, twin hooks rigidly secured to the under side of the body and recurved to present their points laterally below and beyond the sides of the body, a guard having rearwardly diverging prongs provided with widely spread open loops terminating in a restricted tip positioned to be cocked behind the respective hook points, and means for hinging the guard at its forward end to permit the same to swing freely when the prongs are disengaged from the hook points, said means including stops adapted to limit the upward movement of the guard prongs so that in cocking the prongs behind the hook points the same will be held under spring tension when cocked, the prongs being provided with coil spring sections to center the flexibility therein.

4. In a fish lure, a combination of a bait body, twin hooks rigidly secured to the underside of the body and recurved to present their points laterally below and beyond the sides of the body, a guard consisting of a single wire bent to provide rearwardly diverging prongs, each provided at its rear end with an open loop positioned to be cocked behind the associated hook point, and the prongs at their convergent forward ends being united by a cross head and means for hinging the cross head to permit the guard to swing forward freely when both prongs are disengaged from the hook points, said means being in the form of a sleeve secured to the body and journalling the cross head and having stop means adjacent thereto adapted to engage the respective prongs to limit the upward movement of the guard so that in cocking the prongs behind the hook points the same will be held under spring tension when cocked.

JOSEPH McARTHUR.